United States Patent [19]

Yukawa

[11] Patent Number: 5,101,495
[45] Date of Patent: Mar. 31, 1992

[54] AUTOMATICALLY CONFIGURING DATA TRANSFER BUS SYSTEM WITH DIRECT ACCESS OF INFORMATION

[75] Inventor: Hiroshi Yukawa, Hachiouji, Japan

[73] Assignee: Olympus Optical Co., Ltd., Tokyo, Japan

[21] Appl. No.: 255,371

[22] Filed: Oct. 11, 1988

[30] Foreign Application Priority Data

Oct. 12, 1987 [JP] Japan .................. 62-256517

[51] Int. Cl.$^5$ .......................... G06F 3/05; G06F 15/46
[52] U.S. Cl. ................... 395/700; 364/221.7; 364/221.4; 364/474.28; 364/560; 364/562; 364/563; 364/550; 364/DIG. 1
[58] Field of Search ............... 364/560, 551, 560, 200, 364/900, 551.02; 209/545

[56] References Cited

U.S. PATENT DOCUMENTS

| | | | |
|---|---|---|---|
| 3,727,119 | 4/1973 | Stanley et al. | 318/568 |
| 4,056,850 | 11/1977 | Brown | 364/900 |
| 4,152,767 | 5/1979 | Laliotis | 364/560 |
| 4,176,396 | 11/1979 | Howatt | 364/551 |
| 4,351,437 | 9/1982 | Long | 209/545 |
| 4,367,525 | 1/1983 | Brown et al. | 364/200 |
| 4,573,139 | 2/1986 | Bonivich | 364/900 |
| 4,648,718 | 5/1987 | Sadamitsu et al. | 356/387 |
| 4,724,525 | 2/1988 | Purcell et al. | 364/560 |

FOREIGN PATENT DOCUMENTS 2000867 1/1979 United Kingdom .
8602720 5/1986 World Int. Prop. O. .

OTHER PUBLICATIONS

J. K. Atkinson, "Communication Protocols in Instrumentation", Journal of Physics E/Scientific Instruments, vol. 20, No. 5, May 1987, pp. 484–491.
E. W. Harris, Jr., "Coordinate Measuring Machine Data Collector", IEEE Transactions on Industrial Electronics and Control Instrumentation, vol. IECI-22, No. 3, Aug. 1975, pp. 372–374.

*Primary Examiner*—Thomas C. Lee
*Assistant Examiner*—Daniel Pan
*Attorney, Agent, or Firm*—Cushman, Darby & Cushman

[57] ABSTRACT

A data transfer bus in a profile and/or dimension measuring system is used to exchange data between plural controllers and plural passive devices and provided with data lines capable of transferring a measurement data signal, a command signal, a status signal, and an address signal corresponding to each unit and a measurement data latch line capable of transferring a measurement data latch line. Thus, an expansion of the system can extremely be facilitated, a detection error of the edge of an object to be measured can be minimized, and high data transfer efficiency can be assured without complication of hardware.

12 Claims, 7 Drawing Sheets

PRIOR DATA — MEASUREMENT DATA — UNIT (mm, inch, degree, ETC.) — NEXT DATA

FIG. 6

EXAMPLE IN WHICH TWO CONNCTORS ARE PROVIDED

FIG. 7

MEASUREMENT DATA

FIG. 8B (STRUCTURE EXAMPLE OF PASSIVE DEVICE)

FIG. 8A (STRUCTURE EXAMPLE OF CONTROLLER)

AUTOMATICALLY CONFIGURING DATA TRANSFER BUS SYSTEM WITH DIRECT ACCESS OF INFORMATION

BACKGROUND OF THE INVENTION a) Field of the invention

The present invention relates to a data transfer bus in a profile and/or dimension measuring system.

b) Description of the prior art

Figure 1:
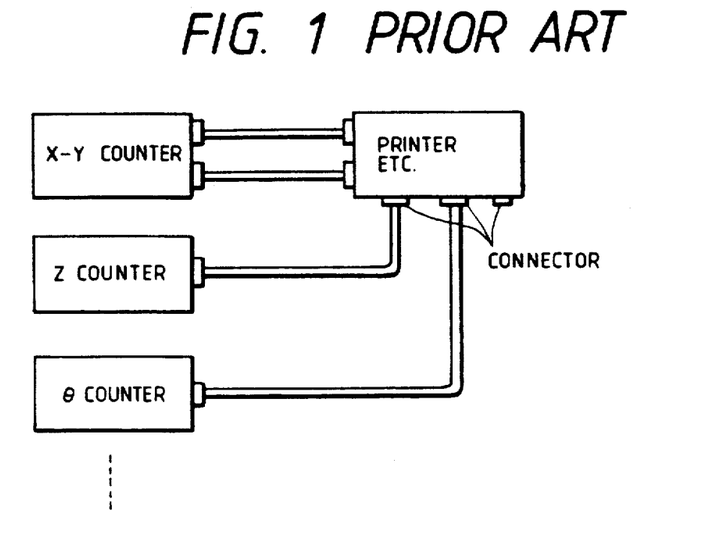
FIG. 1 is a view showing an example of an expansion of a conventional system.

In a profile and/or dimension measuring system, it is indispensable for a future development of the system that a Z-axis counter measuring a profile in a direction of a Z axis of an object to be measured and an angle counter directly measuring angle components of an object to be measured are incorporated therein. Since, however, the data transfer bus in the conventional profile and/or dimension measuring system is a unidirectional one-to-one bus, it is necessary to add connectors each time the system is expanded, as shown in FIG. 1. As a result, problems have been encountered that the complication of hardware and the trouble of an expansion work render the expansion of the system difficult and a incorporation of a Z-axis counter and an angle counter in the system is not facilitated.

Figure 2:
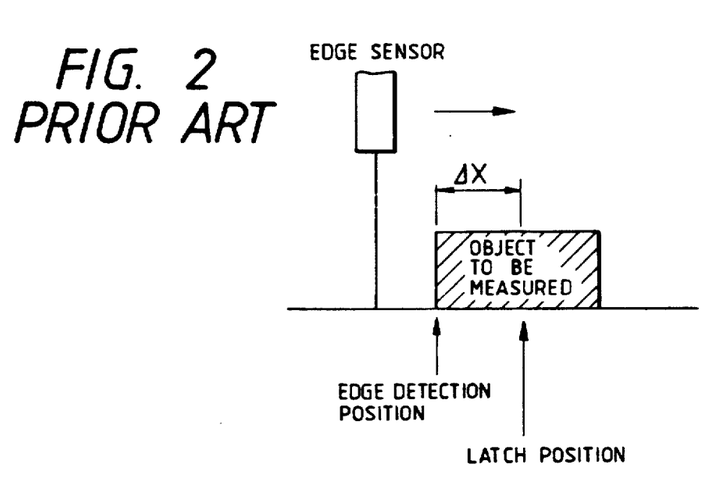
FIG. 2 is a view showing deviation between an edge detection position and a latch position which is caused by the conventional system.

Further, in the profile and/or dimension measuring system, it is also indispensable for the development of the system that an edge detecting device such as an edge sensor or a touch probe is incorporated therein. In such a case, when the edge detecting device detects an edge of the object to be measured, it is necessary to temporarily latch measurement contents derived from individual measuring counters and to execute processing (such as printing with a printer) in accordance with the latched measurement contents. That is, when the edge is detected, it is necessary to transmit the result of the detection to individual measuring units. In this conventional system, however, there have been difficulties that since the data transfer bus is not constructed to transmit a measurement data latch signal, complete synchronization of hardware is not carried out and resultant deviation between an actual edge detection position and a latch position causes a detection error. Specifically, when the edge sensor detects the edge, this information is converted into command to be outputted to the bus and each measuring unit inputting the command latches a counter value (i.e., measurement contents) after interpreting the command For the reason of such procedure, a time lag occurs and deviation, namely, a detection error Δx is produced between the edge detection position and the latch position as depicted in FIG. 2. When a relative velocity between the edge sensor and the object increases, the detection error is so significant that it cannot be disregarded. Thus, although it is suggested that the latch signal is transmitted through other signal line, independently of the data transfer bus, such will cause a problem that hardware such as connectors, cables, etc. is complicated.

Figure 3:
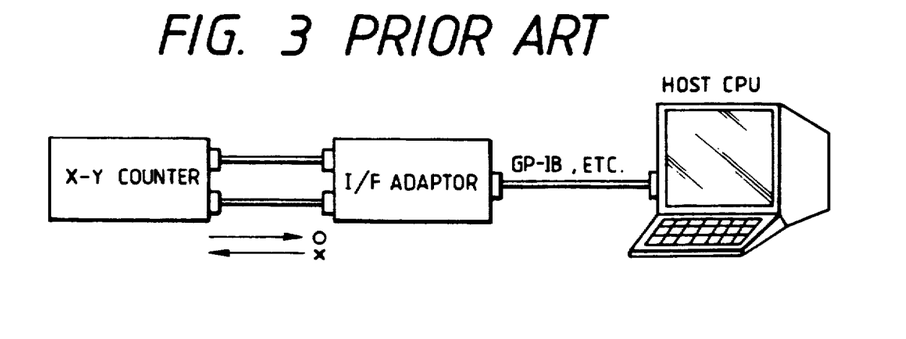
FIG. 3 is a view showing that remote control is impossible in the conventional system.

Furthermore, in the profile measuring system, it is necessary to remote-control various operations from an external portion. However, problems have been brought about that since the conventional data transfer bus is the unidirectional one such that only the measurement data can be transferred, such operation as the clear of the counter cannot be controlled by a host CPU and the like from an external portion as shown in FIG. 3. Although it is therefore considered that an independent signal line is provided inside the bus, such develops troubles that hardware is complicated and the signal line must be increased in the expansion of the system, with the result that the hardware is further complicated. In addition, while it is also suggested that a remote key is attached to each unit, such brings about problems that operability becomes poor and hardware is complicated.

Figure 4:
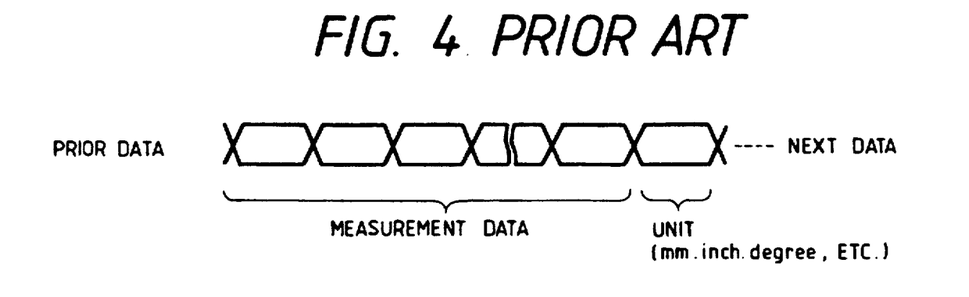
FIG. 4 is a view showing an example of measurement data in the conventional system.

Further, there has also been other problem that because the conventional data transfer bus is the unidirectional one and can transfer only the measurement data, the transfer of the measurement data is continuously made regardless of whether or not the data are required and a measurement unit must be added to the data each time as depicted in FIG. 4, with the result that its transfer efficiency is low.

SUMMARY OF THE INVENTION

An object of the present invention is to provide a data transfer bus in a profile and/or dimension measuring system designed so that the incorporation of a Z-axis counter and an angle counter in the system is facilitated and thereby the expansion of the system can be performed with great ease.

Another object of the present invention is to provide a data transfer bus in a profile and/or dimension measuring system designed so that when an edge of an object is detected, measurement contents of each measuring counter can be latched without any time lag and thereby a detection error is minimized.

Still another object of the present invention is to provide a data transfer bus in a profile and/or dimension measuring system in which remote control from an external portion is made possible, hardware is not complicated, and high transfer efficiency can be assured.

Figures 5A, 5B:
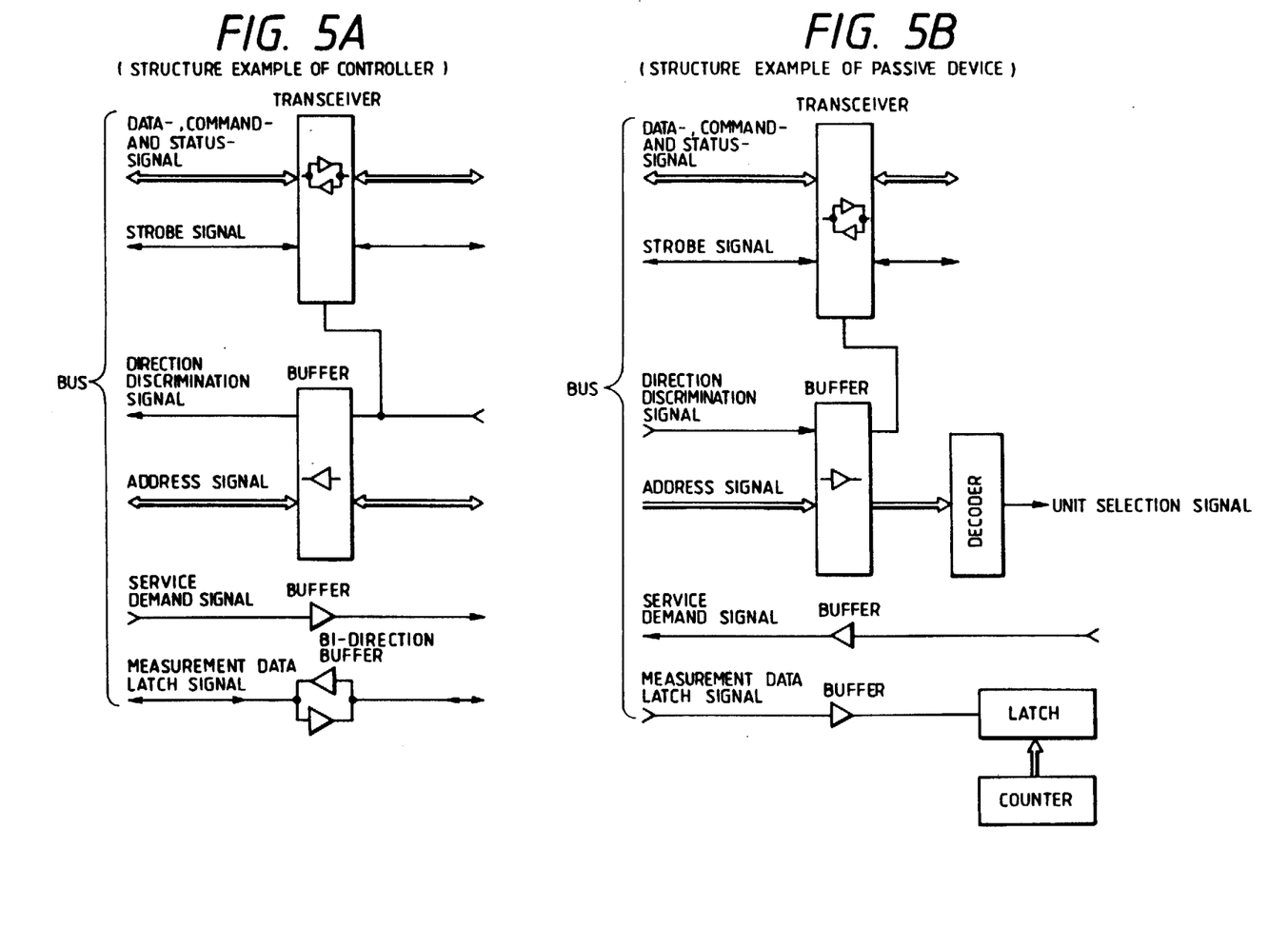
FIGS. 5A and 5B are views showing structural examples of a controller and a passive device, respectively, in the case of the use of a data transfer bus according to the present invention.
Figure 6:
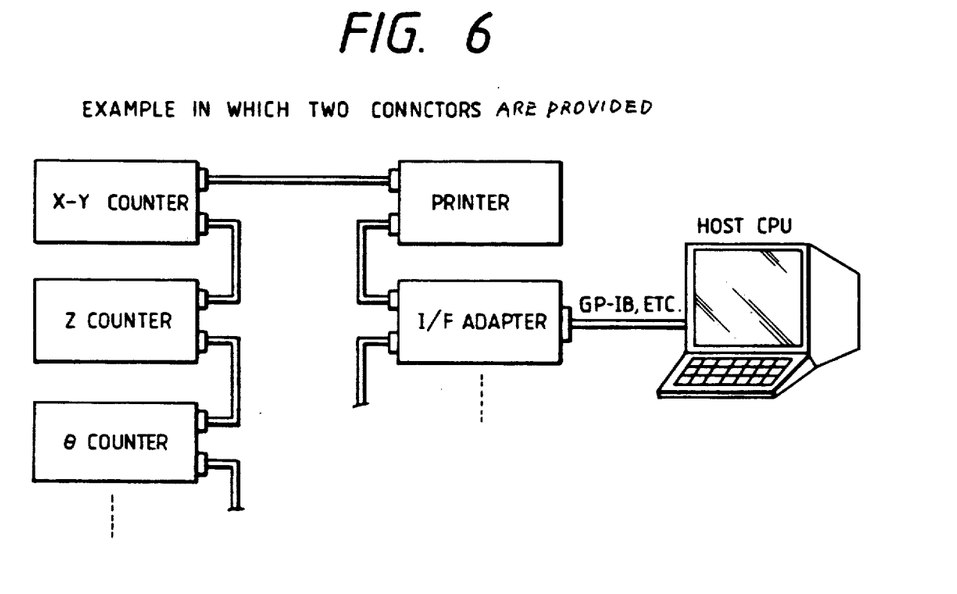
FIGS. 6 and 7 are views showing examples of the expansion of the system and the measurement data, respectively, in the case of the use of the data transfer bus according to the present invention.

A bidirectional data transfer bus according to the present invention includes at least data lines transferring a command signal, a status signal, and the like in addition to a measurement data signal, and a measurement data latch line transferring a measurement data latch signal Accordingly, when the data transfer bus of the present invention is employed, a controller and a passive device of the profile and/or dimension measuring system can be constructed as shown in FIGS. 5A and 5B, respectively. Further, since the data transfer bus is adapted to exchange data between plural controllers and plural passive devices, the bus renders it unnecessary to add connectors in the expansion of the system as shown in FIG. 6 and, as a result, complication free hardware and an easy expansion work facilitate the expansion of the system. Therefore, the Z-axis counter, angle counter and edge detecting device can be incorporated in the profile measuring system without any difficulty. Also, FIG. 6 shows an example of use of two connectors and, if the connector is of a ductile type, one connector will do.

In addition, the data transfer bus of the present invention is constructed to be capable of transferring the measurement data latch signal, so that the conversion of information into command and the interpretation of command are not required in the edge detection and the measurement contents of each measuring counter can be latched without any time lag. As a result, deviation between the edge detection position and the latch position is hardly caused and the detection error can be minimized.

Figure 7:
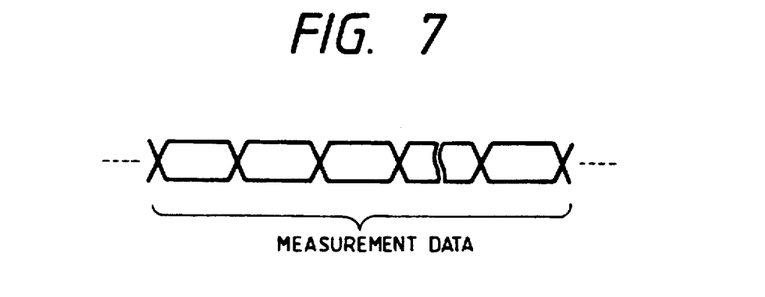

Moreover, the data transfer bus of the present invention is bidirectional and is designed to be capable of transferring the command signal and the status signal in addition to the measurement data signal, so that a host CPU or a remote key allows remote control from an external portion as depicted in FIG. 6. Also, from the same reason, it is possible that, when a power source is turned on, a measurement unit and setup contents of each unit and the units connected to the bus (namely, turned on) are registered and, in the case of a setup change, re-registration takes place each time. Hence, the controller can extend its service to only the unit connected to the bus and the addition of the measurement unit can be omitted in the transfer of the measurement data as shown in FIG. 7, with the result that the transfer efficiency can be raised.

Figure 8A:
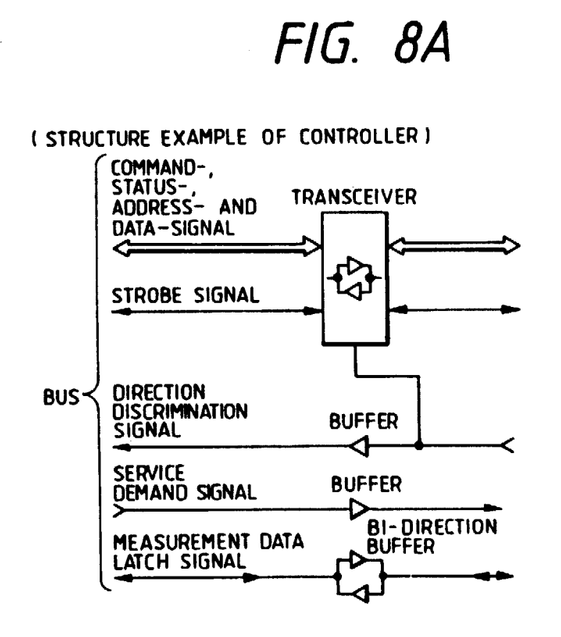
FIGS. 8A and 8B are views showing other structural examples of the controller and the passive device, respectively, in the case of the use of a data transfer bus according to the present invention.
Figure 8B:
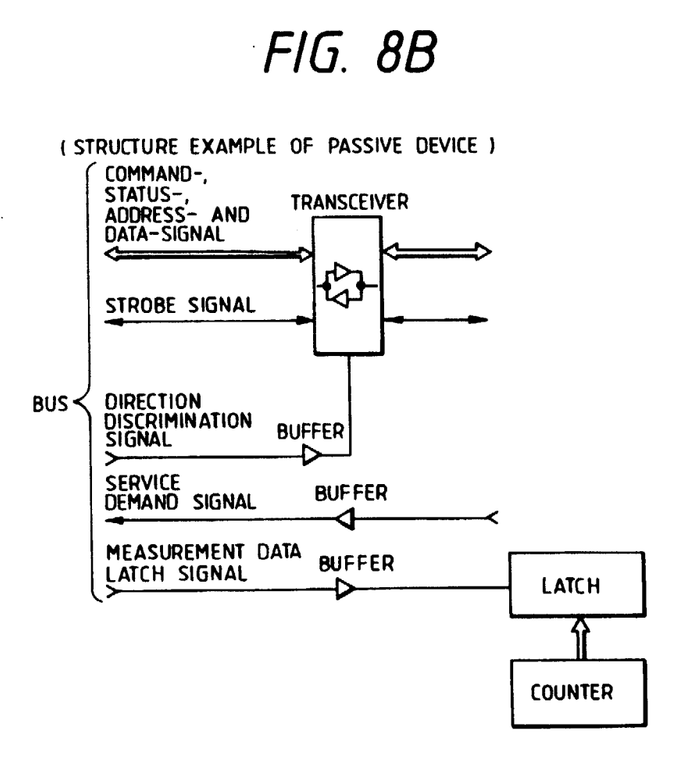

Further, an address signal is added to the command signal and thereby address lines can also be omitted as shown in FIGS. 8A and 8B. In this case, the unit inputting the command interprets an address part to meet only the corresponding command.

These and other objects as well as the features and the advantages of the present invention will become apparent from the following detailed description of the preferred embodiment when taken in conjunction with the accompanying drawings.

DESCRIPTION OF THE PREFERRED EMBODIMENT

In accordance with an embodiment shown in the drawings, the present invention will be described in detail below.

Figure 9A:
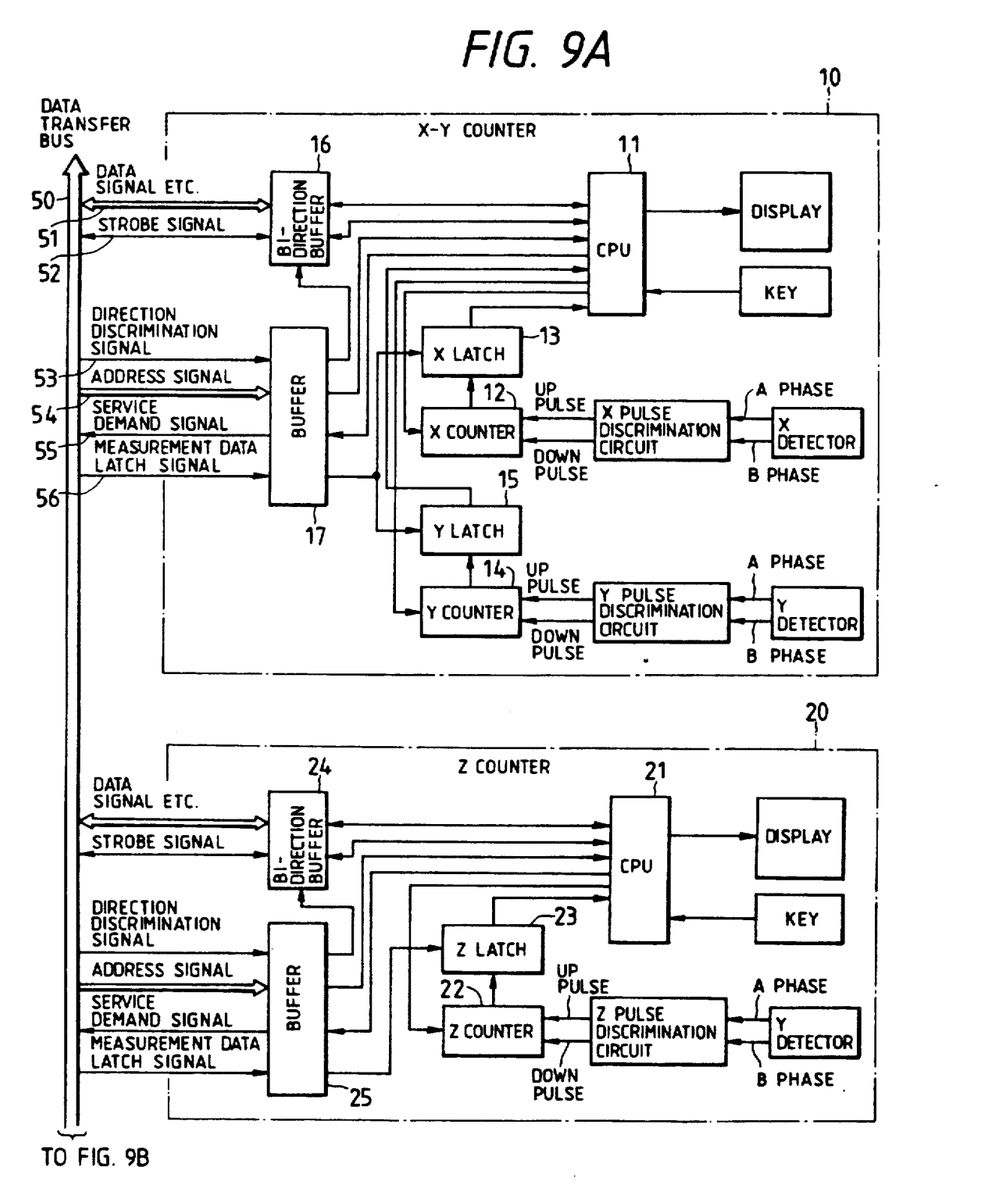
FIGS. 9A and 9B are block circuit diagrams of a profile measuring system using an embodiment of the data transfer bus according to the present invention.
Figure 9B:
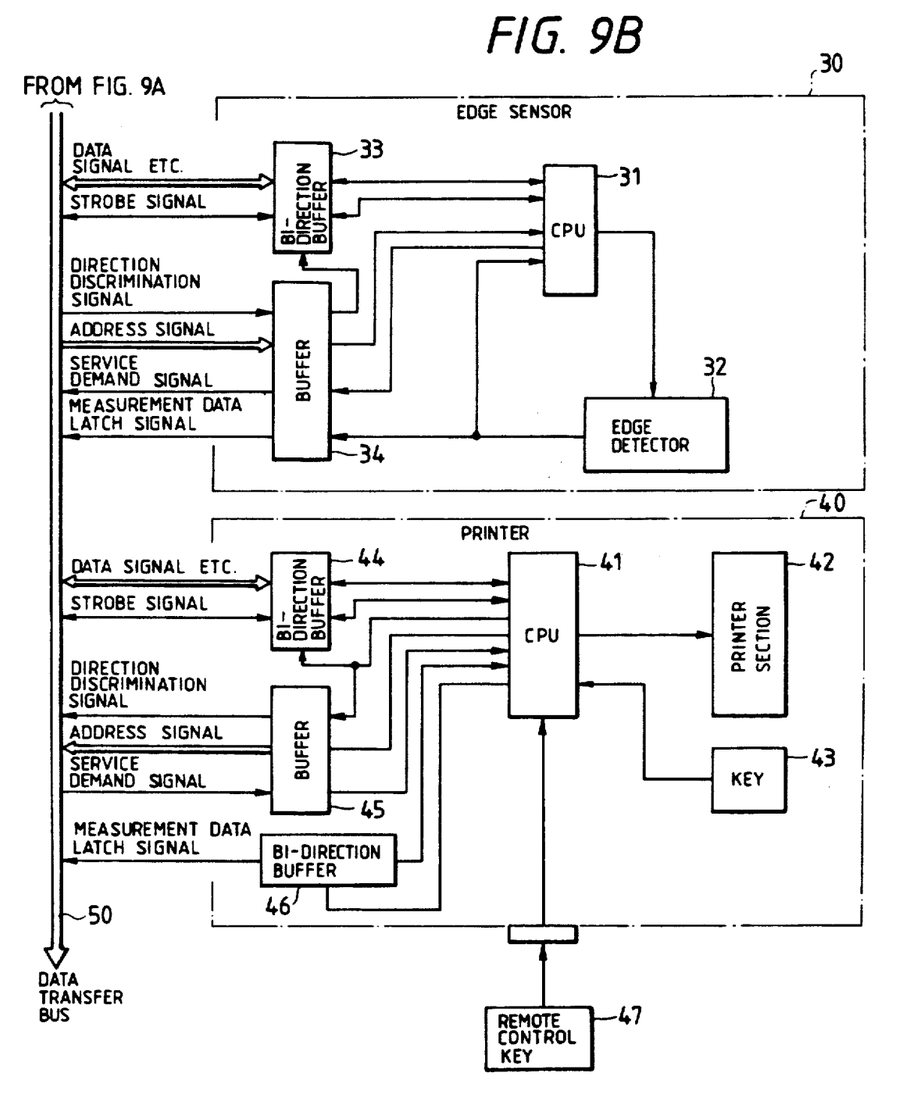

In FIGS. 9A, 9B, reference numeral 10 represents an X-Y counter including a CPU 11, an X counter 12, an X latch 13, a Y counter 14, a Y latch 15, a bidirection buffer 16, a buffer 17 a display 100, a key 101, an X pulse discrimination circuit 102, an X detector 103, a Y pulse discrimination circuit 104, and a Y detector 105. Reference numeral 20 represents a Z counter including a CPU 21, a Z counter 22, a Z latch 23, a bidirection buffer 24, a buffer 25 a display 200, a key 201, a Z pulse discrimination circuit 202, and a Y detector 203. Reference numeral 30 represents an edge sensor including a CPU 31, an edge detector 32, a bidirection buffer 33, and a buffer 34. Reference numeral 40 represents a printer including a CPU 41, a printer section 42, a key 43, a bidirection buffer 44, a buffer 45, a bidirection buffer 46, and a remote control key 47. Reference numeral 50 represents a data transfer bus of the present invention comprising a data line 51, a strobe line 52, a direction discrimination line 53, an address line 54, a service demand line 55, and a measurement data latch line 56 and, through the data transfer bus 50, the X-Y counter 10, the Z counter 20, the edge sensor 30, and the printer 40 are connected to each other.

Next, an operating principle of the profile measuring system described above will be explained.

Figure 10:
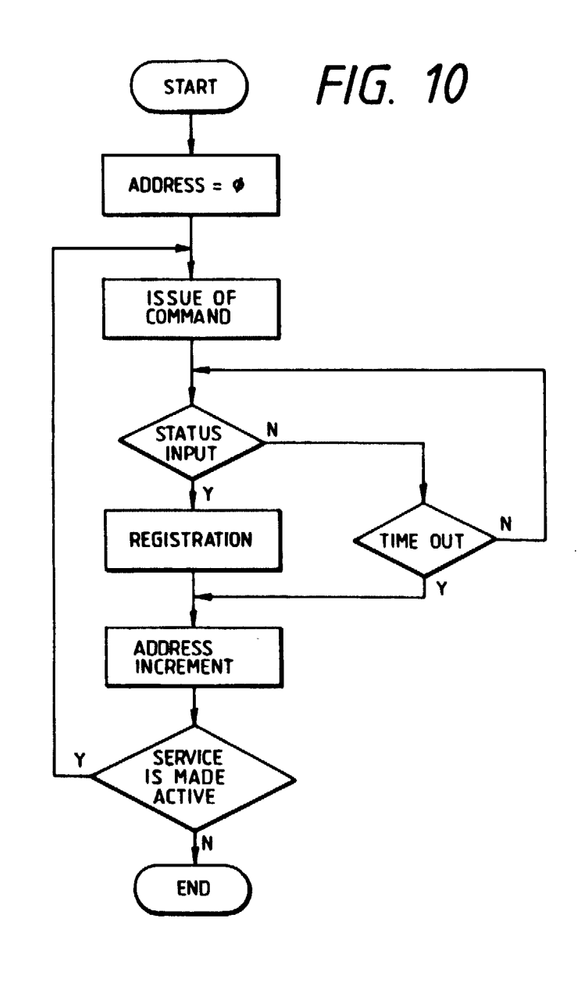
FIGS. 10 and 11 are flow charts of an initial register operation and a printing operation by a key input, respectively, in the block diagram of FIG. 9.

[1] Initial register operation (Refer to FIG. 9)

(1) When the power source is turned on, the CPU 11 of the X-Y counter 10 activates a service demand signal.
(1') When the power source is turned on, the CPU 21 of the Z counter 20 activates the service demand signal.
(1") When the power source is turned on, the CPU 31 of the edge sensor 30 activates the service demand signal.

(2) When the service demand signal becomes active, the CPU 41 of the printer 40 activates a direction discrimination signal and simultaneously turns the direction of the bidirection buffer 44 to an output mode. Further, the units of the X-Y counter 10 are addressed. After this, the command signal is fed to the X-Y counter 10. The CPU 41 then deactivates the direction discrimination signal and is placed in a wait state for the return of the status signal.

(3) In the bidirection buffer 16 of the X-Y counter 10, the direction discrimination signal becomes active and thereby its direction turns to an input mode. When the units are addressed by CPUH1 of Printer H0, the CPU 11 acknowledges that its own units are being specified. Next, when the command signal is inputted, the CPU 11 interprets its contents and then returns the status of its own units to the bus 50 as a response. After this, the CPU 11 deactivates its service demand signal. Since, however, the service demand signal is made by wired OR connection, it remains in an active state within the printer 40 as long as the service demand signals in the Z counter 20 and the edge sensor 30 are active.

(4) The CPU 41 of the printer 40 registers the X-Y counter 10 when inputting the return of the status signal. Conversely, when the status signal is not returned, the registration is not executed. In other words, unless the power source of the X-Y counter 10 is turned on or unless the X-Y counter 10 is connected to the bus 50, the registration will not be carried out because the status signal will not be returned.

(5) If the service demand signal still active after receiving the status signal at that time, the CPU 41 of the printer 40 performs the same operation as in procedures (2), (3) and (4) with respect to the Z counter 20. The same applies to the edge sensor 30.

Figure 11:
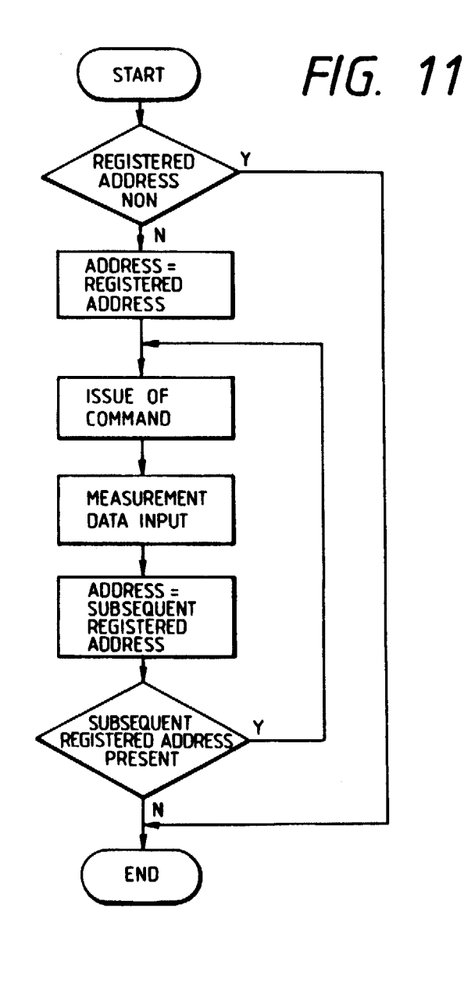

[2] Printing operation with key input (Refer to FIG. 9)

(1) When a printing indication key of the key 43 of the printer 40 is depressed, the CPU 41 activates a counter latch signal.

(2) The signal line of the counter latch signal is directly connected to the X latch 13 and the Y latch 15 of the X-Y counter 10 through the buffer 17 and, when this signal becomes active, the X latch 13 and the Y latch 15 latch counting data of the X counter 12 and the Y counter 14, respectively.

(3) The CPU 41 of the printer 40 addresses the units of the X-Y counter 10 and activates the direction discrimination signal. Thus, the direction of the bidirection buffer 44 turns to the output mode. However, where the X-Y counter 10 is not registered, the same operation is performed with respect to the Z counter 20.

(4) When the units are addressed, the CPU 11 of the X-Y counter 10 acknowledges that it is specified. Also, the direction discrimination signal becomes active and thereby the direction of the bidirection buffer 16 turns to the input mode.

(5) The CPU 41 of the printer 41 feeds the command signal to the X-Y counter 10. Then, the CPU 41 deactivates the direction discrimination signal. Thereby, the bidirection buffer 44 enters the input mode. Next, the CPU 41 is placed in a wait state for the return of the measurement data.

(6) When inputting the command signal, the CPU 11 of the X-Y counter 10 interprets the contents. After this, the CPU 11 fetches measurement data from the X latch 13 and the Y latch 15. The measurement data are then outputted to the bus 50.

(7) The CPU 41 of the printer 40 inputs the measurement data for storing.

(The operations of procedures (3)~(7) are performed in relation to the Z counter 20. However, unless the Z counter 20 is registered, the operations are not performed.)

(8) The printer 40 outputs all of the inputted measurement data to the printer section 42.

[3] Operation with remote key input (where an X counter reset key is ON)

(1) When the X counter reset key of the remote control key 47 in the printer 40 is depressed, the CPU 41 addresses the units of the X-Y counter 10. Further, the CPU 41 activates the direction discrimination signal. The bidirection buffer 44 thus enters the output mode.

(2) When the units are addressed, the CPU 11 of the X-Y counter 10 acknowledges that the self-unit is specified. Also, the direction discrimination signal becomes active and thereby the bidirection buffer 16 turns to the input mode.

(3) The CPU 41 of the printer 40 feeds the command signal to the X-Y counter 10.

(4) When the command signal is inputted to the counter 10, the CPU 11 of the X-Y counter 10 interprets its contents. After this, the CPU 11 activates a clear signal of the X counter 12, thereby clearing the X counter 12.

[4] Where the edge sensor detects the edge of an object to be measured:

(1) When the edge detector 32 of the edge sensor 30 detects the edge of the object to be measured, a detecting signal is activated. Simultaneously, the counter latch signal turns active through the buffer 34 and the CPU 31 recognizes that the edge of the object has been detected.

(2) The signal line of the counter latch signal is directly connected to the X latch 13 and the Y latch 15 of the X-Y counter 10 through the buffer 17 and, when this signal becomes active, the X latch 13 and the Y latch 15 latch the counting data of the X counter 12 and the Y counter 14, respectively.

(3) The signal line of the counter latch signal is directly connected to the Z latch 23 of the Z counter 20 through the buffer 25 and, when the signal turns active, the Z latch 23 latches the counting data of the Z counter 22.

(4) The signal line of the counter latch signal is connected to the CPU 41 of the printer 40 through the bidirection buffer 46 and, when the signal turns active, the CPU 41 recognizes that the edge has been detected. The CPU 41 then addresses the units of the X-Y counter 10. Further, it activates the direction discrimination signal. Thereby, the bidirection buffer 44 enters the output mode However, where the X-Y counter 10 is not registered, the same operation is performed with regard to the Z counter 20.

(5) When the units are addressed, the CPU 11 of the X-Y counter 10 acknowledges that it is specified. Further, the direction discrimination signal becomes active and thus the bidirection buffer 16 turns to the input mode.

(6) The CPU 41 of the printer 40 transmits the command signal to the X-Y counter 10. After that, the CPU 41 deactivates the direction discrimination signal. Thus, the bidirection buffer 44 enters the input mode. Next, the CPU 41 is placed in a wait state for the return of the measurement data.

(7) When the command signal is inputted to the X-Y counter 10, the CPU 11 of the X-Y counter 10 interprets its contents. After that, the measurement data are fetched from the X latch 13 and the Y latch 15. The measurement data are then outputted to the bus 50.

(8) The CPU 41 of the printer 40 inputs and stores the measurement data.

(The operations of procedures (4)~(8) are performed with respect to the Z counter 20. However, unless the Z counter 20 is registered, the operations are not performed.)

(9) The CPU 41 of the printer 40 outputs all of the inputted measurement data to the printer section 42. Subsequently, the CPU 41 addresses the units of the edge sensor 30. Further, the direction discrimination signal is activated. Thereby, the bidirection buffer 44 turns to the output mode.

(10) When the units are addressed, the CPU 31 of the edge sensor 30 recognizes that the self-unit is specified. Also, the direction discrimination signal is activated and thereby the bidirection buffer 33 enters the input mode.

(11) The CPU 41 of the printer 40 inputs the command signal to the edge sensor 30.

(12) When the command signal is inputted, the CPU 31 of the edge sensor 30 interprets its contents. After that, the CPU 31 releases the detection state of the edge detector 32. The subsequent edge detection is thus made possible.

As described above, the data transfer bus in the profile and/or dimension measuring system according to the present invention facilitates extremely the expansion of the system to easily incorporate the Z-axis counter and the angle counter in the system, latches the measurement contents of each measuring counter without any time lag in the edge detection so that the detection error can be minimized, makes it possible to perform the remote control from an external portion, prevents hardware from being complicated, and can raise the transfer efficiency.

What is claimed is:

1. A data transfer bus system used to exchange data between at least one controller and plural measurement devices in a profile and/or dimension measuring system, comprising:

at least data lines transferring:
a) a measurement data signal indicative of current measurement data from a current measurement device,
b) a command signal requesting status, and
c) a status signal reporting status;

at least one latch, connected to directly receive said measurement data from at least one of the measurement devices; and a measurement data latch line transferring a measurement data latch signal to said at least one latch which, when active, commands said current measurement data which has been directly received from said at least one measurement device to be latched in said at least one latch.

2. A data transfer bus according to claim 1, wherein said data lines also transfer an address signal corresponding to each unit constituting said system.

3. A data transfer bus according to claim 1 wherein said data signals further include a signal indicative of a direction of data transfer on said bus.

4. A data transfer bus as in claim 1 further comprising a service demand line, which is wired ORed to all of said plural controllers and plural passive devices attached to said bus.

5. A data transfer system, comprising:

a data transfer bus including
a) data lines for transferring a measurement data signal indicative of current measurement data, a command signal requesting status and a status signal reporting status, and
b) a service demand signal line for transferring a service demand signal requesting service;

a plurality of detection devices for producing system data, each for producing a service demand signal on initial operation, and receiving a command signal and responding by producing a status signal and removing said service demand signal responsive to receiving said command signal; and controlling means, including a memory, connected to said plural detecting devices and to said means for detecting current information, for:

1) determining if said service demand signal is active and sending said command signal to a first device if so;
2) receiving said status signal from said first device and storing an address of said first device in said memory;
3) determining if said service demand signal still exists and repeating functions 1) and 2) for a second and a third device and so on if so until said service demand signal no longer exists, thereby automatically producing a list of addresses of all said devices in said memory.

6. A data transfer system according to claim 5, wherein said data transfer bus also transfers an address signal corresponding to each detection device constituting said system.

7. A data transfer system according to claim 5, wherein said detection services include measurement detection devices, and said data transfer bus also includes a measurement data latch line that transfers a measurement data latch signal indicating that a current measurement data should be latched.

8. A data transfer system as in claim 5 wherein said detecting devices include an XY detecting device and a Z detecting device.

9. A data transfer system according to claim 7, wherein said measurement detection devices produce measurement data, and include means for latching said measurement data signal responsive to said measurement data latch signal on said measurement data latch line.

10. A data transfer system according to claim 9, further comprising means for determining that said current measurement data is correct and for producing said measurement data latch signal when said current information is correct.

11. A data transfer system according to claim 10 wherein said data transfer bus further includes a line for a direction discrimination signal indicative of a direction of data transfer on said data lines, and said controlling means is also for:

4) operating said direction discrimination signal to indicate different directions during said command signal and said status signal.

12. A data transfer system as in claim 10 wherein said means for detecting current information is an edge detector.

* * * * *

UNITED STATES PATENT AND TRADEMARK OFFICE
CERTIFICATE OF CORRECTION

PATENT NO. : 5,101,495

DATED : March 31, 1992

INVENTOR(S) : YUKAWA, Hiroshi

It is certified that error appears in the above-identified patent and that said Letters Patent is hereby corrected as shown below:

Col. 8, Claim 7, line 2 thereof, change "services" to -- devices --.

Signed and Sealed this

Twentieth Day of July, 1993

Attest:

MICHAEL K. KIRK

*Attesting Officer*     *Acting Commissioner of Patents and Trademarks*